United States Patent [19]
Pezzutti
[11] 3,753,130
[45] Aug. 14, 1973

[54] DIGITAL FREQUENCY COMPARATOR

[75] Inventor: David August Pezzutti, Eatontown, N.J.
[73] Assignee: Bell Telephone Laboratories Incorporated, Murray Hill, N.J.

[22] Filed: Mar. 9, 1972
[21] Appl. No.: 233,085

[52] U.S. Cl. .................. 328/141, 328/138, 328/110
[51] Int. Cl. .................. H03k 5/20
[58] Field of Search .................. 328/110, 134, 141, 328/138

[56] References Cited
UNITED STATES PATENTS

| | | | |
|---|---|---|---|
| 3,226,577 | 12/1965 | Azuma et al. | 328/110 X |
| 3,413,490 | 11/1968 | Breunig et al. | 328/110 X |
| 3,521,174 | 7/1970 | Naubereit et al. | 328/141 X |
| 2,961,611 | 11/1960 | Young et al. | 328/141 X |

*Primary Examiner*—John S. Heyman
*Attorney*—W. L. Keefauver

[57] ABSTRACT

A digital frequency comparator is realized by employing a retriggerable monostable multivibrator in combination with a coincidence gate. The timing interval of the monostable multivibrator is set at a predetermined value corresponding to a desired reference frequency. When the frequency of an applied signal is greater than the reference, the monostable is retriggered prior to timing-out. Consequently, signals applied to the gate are periodically in coincidence, thereby indicating that the frequency of the applied signal is greater than the reference.

10 Claims, 5 Drawing Figures

DIGITAL FREQUENCY COMPARATOR

BACKGROUND OF THE INVENTION

This invention relates to frequency comparators and, more particularly, to digital frequency comparators for indicating whether the frequency of an applied signal is greater or less than a reference frequency.

In numerous systems, the presence or absence of a signal having a particular frequency must be detected. For example, data transmission systems employ frequency shift keyed signals for indicating various operating modes of the system. Therefore, it is imperative that the presence or absence of signals at particular frequencies is detected rapidly in order to minimize possible system errors.

In a prior known system, frequency detection is achieved by employing a plurality of resonant circuits. Each resonant circuit is tuned to a particular frequency of interest. Although such a prior detection system is adequate in many applications, it has certain undesirable features. For example, the required use of capacitors and inductors in the resonant circuits is undesirable in modern electronic systems employing integrated circuits.

In another prior known system, the presence of a particular frequency is detected digitally. One such digital system is disclosed in U.S. Pat. No. 3,202,834 issued to C. O. Pingry and G. W. Hobgood on Aug. 24, 1965. In the circuit of the above patent, a specific narrow band of frequencies is detected by employing a zero crossing detector, first and second monostable multivibrators and an AND gate. The timing interval of a first one of the multivibrators is set at a value representative of a particular reference frequency being detected. The second one of the multivibrators is employed merely to generate a narrow pulse at the end of the timing interval of the first multivibrator. Pulse signals representing the zero crossings of a received signal are supplied to the first multivibrator and to a first input of the AND gate. The output of the second multivibrator is supplied to a second input of the AND gate. Coincidence between the signals supplied to the AND gate indicates that the received signal is at the reference frequency. When the frequency of the received signal is either above or below the reference frequency, the signals supplied to the AND gate are not in coincidence. Indeed, when the frequency of the received signal is greater than the reference, the first monostable does not even respond to all of the zero crossing signals. Accordingly, no distinction is made between signals at frequencies greater or less than the reference frequency. Although this prior digital frequency discriminator circuit functions satisfactorily in many applications, it is limited to detecting the presence of a signal at a particular frequency. Therefore, it is undesirable for application in numerous systems which require an indication of the presence or absence of signals at frequencies both greater and less than a predetermind reference frequency.

SUMMARY OF THE INVENTION

These and other problems are resolved, in accordance with the invention, in a digital frequency comparator circuit by employing a retriggerable monostable multivibrator in combination with a coincidence gate. Pulse signals representative of the edges of a received pulsating signal or, alternatively, representative of the zero crossings of a received alternating signal are supplied to a first input of the coincidence gate and to an input of the retriggerable monostable multivibrator. Output signals from the monostable multivibrator are supplied to a second input of the coincidence gate. The timing interval of the monostable multivibrator is set at a predetermined value corresponding to a reference frequency of interest. When the frequency of a received signal is less than the reference, the monostable multivibrator "times-out" prior to being retriggered and the signals supplied to the gate are not in coincidence. Consequently, there is no change in the output of the gate. However, when the frequency of a received signal is greater than the reference frequency, the multivibrator is retriggered prior to "timing-out." That is to say, the timing interval of the monostable multivibrator is reinitiated prior to termination of the previous timing interval. This retriggering occurs until the frequency of the received signal again is less than the reference frequency. The output of the monostable multivibrator remains in a predetermined state while the retriggering mode subsists. Consequently, the signals supplied to the gate are periodically in coincidence, thereby causing the output state of the gate to change indicating that the frequency of the received signal is greater than the reference. A flip-flop circuit supplied with the output from the coincidence gate and the output from the retriggerable monostable multivibrator is employed to indicate the duration that the frequency of the received signal is greater or less than the reference.

BRIEF DESCRIPTION

These and other objects and advantages of the invention will be more fully understood from the following detailed description of an illustrative embodiment thereof taken in connection with the appended drawings in which.

DETAILED DESCRIPTION

Figure 1:
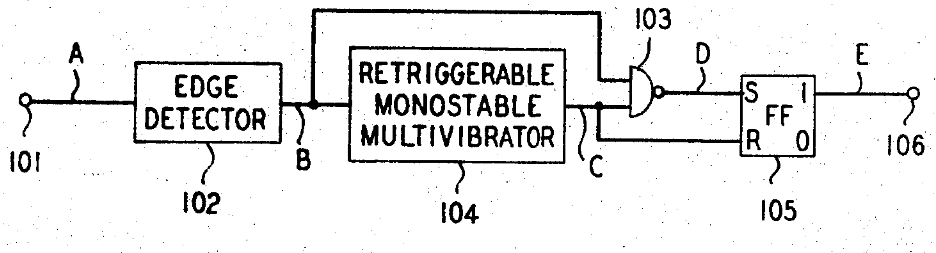
FIG. 1 depicts in simplified block form a digital frequency comparator illustrating the invention.
Figure 2:
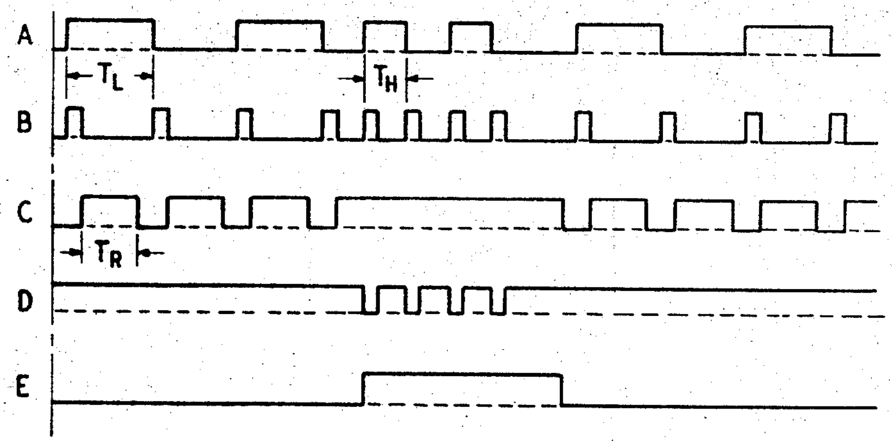
FIG. 2 shows a sequence of waveforms useful in describing the operation of the frequency comparator of FIG. 1.

FIG. 1 illustrates a circuit which, in accordance with the invention, indicates when an applied signal is at a frequency greater or less than a predetermined reference frequency. FIG. 2 shows waveforms of signals developed in the circuit of FIG. 1. The waveforms of FIG. 2 have been labeled to correspond to the circuit points indicated in FIG. 1.

Figure 3:
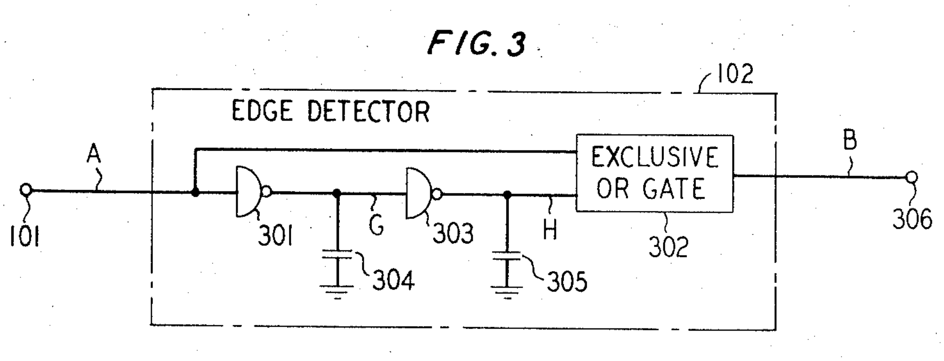
FIG. 3 shows details of the edge detector employed in the frequency comparator of FIG. 1.

Accordingly, an applied signal, for example, a pulsating signal as shown in waveform A of FIG. 2, is supplied via terminal 101 (FIG. 1) to edge detector 102. Detector 102 generates pulse signals representative of the leading and trailing edges of the supplied signal, as shown in waveform B of FIG. 2. In practice, the pulses generated by detector 102 have pulse width intervals substantially less than the pulse intervals of the original supplied signal. This ensures proper timing in the comparator circuit. Any one of the numerous edge detector circuits known in the art may be employed for this purpose. Details of a preferred edge detector are shown in FIG. 3 to be discussed below.

Figure 5:
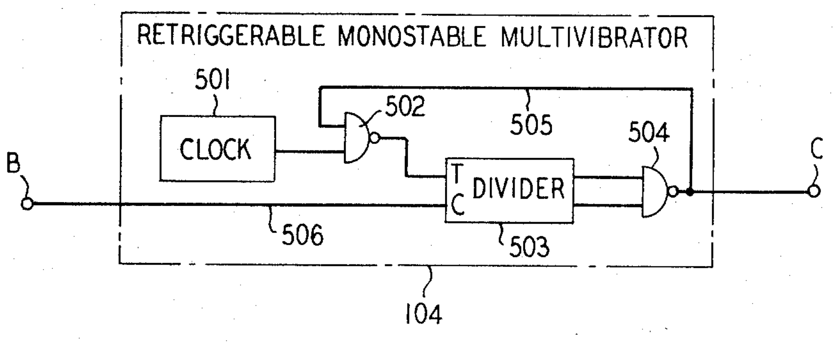
FIG. 5 shows details of the retriggerable monostable multivibrator utilized in the frequency comparator of FIG. 1.

Pulse signals generated by detector 102 are supplied to a first input of NAND gate 103 and to an input of retriggerable monostable multivibrator 104. Normally, monostable 104 is in a stable mode. Monostable multivibrator 104 responds to the output pulses from detector 102 to generate a pulsating signal as shown in waveform C of FIG. 2. The timing interval of the unstable mode of monostable 104 is set at a predetermined value corresponding to a desired reference frequency, for example, interval $T_R$ indicated in waveform C of FIG. 2. When the frequency of the supplied signal is less than the reference frequency, as indicated by interval $T_L$ in waveform A of FIG. 2, monostable 104 "times-out" prior to being retriggered, as shown in waveform C of FIG. 2. That is to say, monostable 104 completes its individual timing intervals prior to being retriggered when the frequency of the supplied signal is below the reference. However, when the frequency of the supplied signal is greater than the reference frequency, as indicated by interval $T_H$ in waveform A, of FIG. 2, monostable 104 is retriggered, in accordance with the invention, prior to "timing-out." Consequently, timing interval $T_R$ is reinitiated and the output of monostable 104 remains in a high state until the frequency of the supplied signal drops below the reference frequency, also indicated in waveform C of FIG. 2. Any one of the retriggerable monostable multivibrators known in the art may be employed in practicing the invention. Details of a preferred digital retriggerable monostable circuit are shown in FIG. 5 to be discussed below.

The output of monostable multivibrator 104 is supplied to a second input of NAND gate 103 and to the reset input of flip-flop circuit 104. NAND gate 103 responds, in accordance with the invention, to the concurrent application of signals having a predetermined state from the outputs of edge detector 102 and monostable 104 to generate pulse signals as shown in waveform D of FIG. 2. Thus, in this example, NAND gate 103 yields, in accordance with the invention, pulse signals at its output only when the frequency of the supplied signal is greater than the predetermined reference frequency, i.e., when monostable 104 is being retriggered prior to timing-out.

The output from NAND gate 103 is supplied to the set input of flip-flop 105. Flip-flop 105 responds to the output from NAND gate 103 and the output from monostable 104 to generate, at point 106, a pulse signal as shown in waveform E of FIG. 2. As can be seen from the waveforms of FIG. 2 of this example, the frequency comparator of the instant invention yields, at point 106, low state and high state signals indicating intervals when the frequency of the supplied signal is less than and greater than the reference frequency, respectively.

Figure 4:
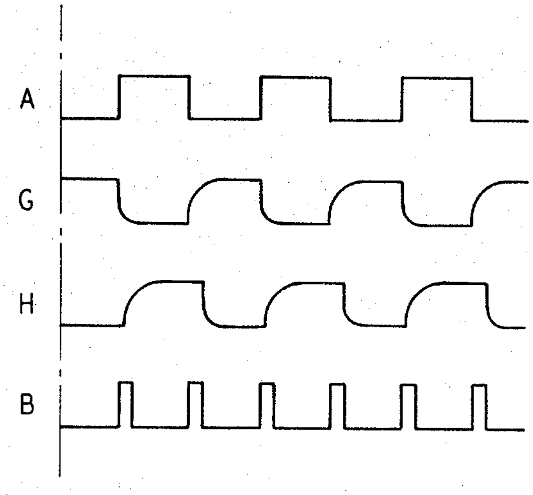
FIG. 4 shows a sequence of waveforms useful in describing the operation of the edge detector of FIG. 3.

Referring now to FIG. 3, there are shown details of edge detector 102 of FIG. 1. FIG. 4 illustrates waveforms of signals developed in the circuit of FIG. 3. These waveforms have been labeled to correspond to the points indicated in the circuit of FIG. 3. Accordingly, a signal as shown in waveform A of FIG. 4 is supplied via terminal 101 to NAND gate 301 (FIG. 3) and to one input of EXCLUSIVE-OR gate 302. In this example, NAND gate 301 is utilized in well-known fashion as an inverter. The output of NAND gate 301 is supplied to NAND gate 303 and to shunt capacitor 304. NAND gate 303 is also utilized as an inverter. Capacitor 304 is employed to delay the edges of the pulse signal developed at the output of NAND gate 301, as illustrated in waveform G of FIG. 4. The inverted delay version of the supplied signal, as shown in waveform G of FIG. 4, is supplied to NAND gate 303. The output of NAND gate 303 is supplied to a second input of EXCLUSIVE-OR gate 302 and to shunt capacitor 305. Capacitor 305 is employed to delay the edges of the signal developed at the output of NAND gate 303 by a desired interval. Accordingly, NAND gates 301 and 303 in combination with capacitors 304 and 305, respectively, generate a delayed version of the supplied signal, as shown in waveform H of FIG. 4. The delay intervals have been greatly exaggerated for purposes of illustration. EXCLUSIVE-OR gate 302 responds in well-known fashion to the supplied signal and to the output of NAND gate 303, as shown in waveforms A and H of FIG. 4, respectively, to generate pulse signals, as shown in waveform B of FIG. 4, representative of the leading and trailing edges of the supplied signal. In an example from practice, not to be construed as limiting the scope of the invention, capacitors having component values of approximately 1,000 picofarads are employed to realize pulse signals at point 306 of FIG. 3 having an interval of approximately 1 microsecond.

Referring now to FIG. 5, there are shown in simplified block form details of retriggerable monostable multivibrator 104 of FIG. 1. Briefly, reference pulse signals generated at predetermined intervals by clock 501 are supplied to a first input of NAND gate 502. Initially, NAND gate 502 is inhibited. The output of NAND gate 502 is supplied to the toggle input of divider 503. Predetermined binary outputs of divider 503 are supplied to individual inputs of NAND gate 504. The output of NAND gate 504 which is the desired multivibrator output, is also supplied to a second input of NAND gate 502. Divider 503 is responsive to yield high state signals at each of its outputs after a predetermined number of reference pulses have been supplied to its toggle input.

Initially, retriggerable monostable multivibrator 104 is disabled. A trigger pulse, for example, a pulse as shown in waveform B of FIG. 2, is supplied to the clear input of divider 503 (FIG. 5). This sets divider 503 to a predetermined state, for example, a low state at each of its outputs. Consequently, the output of NAND gate 504 switches to a high state. This, in turn, enables NAND gate 502 and clock pulses are supplied to the toggle input of divider 503. After a predetermined number of pulses have been supplied, the outputs of divider 503 simultaneously yield high state signals. This causes the output of NAND gate 504 to switch to a low state, thereby disabling both NAND gate 502 and monostable multivibrator 104 until the next trigger pulse is received. Should a trigger pulse be supplied during the monostable timing interval, divider 503 is still cleared and another timing interval is initiated, i.e., the monostable multivibrator is retriggered. This retriggering occurs until monostable 104 is allowed to "time-out" prior to the supply of another trigger pulse.

The frequency of clock 501 and divisor of divider 503 are selected to yield a desired precision and also to obtain a desired reference output from monostable 104. It is readily seen that as the frequency of clock 501 is increased, delay in retriggering in monostable 104 is decreased. Accordingly, a more rapid indication of a change in frequency of a supplied signal is achieved by utilizing a higher frequency in clock 501. A retriggerable monostable multivibrator which may be employed in the practice of the invention is described in greater detail in my copending U.S. Pat. application, Ser. No. 233,087, filed Mar. 9, 1972.

What is claimed is:

1. A circuit for detecting changes in the frequency of a signal which comprises:

means for generating first pulse signals representative of the occurrence of the rise and fall times of an applied pulse signal;

means having stable and unstable modes of operation for generating second pulse signals in response to each of said first pulse signals, the normal time interval of said unstable mode being representative of a predetermined reference frequency, said unstable time interval being reinitiated in response to each of said first pulse signals;

means responsive to said first and second pulse signals for generating third pulse signals representative of intervals when individual ones of said first pulse signals occur during intervals of said second pulse signals; and means selectively responsive to said second and third pulse signals for generating a fourth pulse signal representative of intervals when the frequency of said applied signal is greater than and less than said reference frequency.

2. The invention as defined in claim 1 wherein said third pulse signal generating means includes logic network means being responsive to the momentary simultaneous application of said first and second pulse signals to generate said third pulse signals.

3. The invention as defined in claim 2 wherein said second pulse signal generating means includes a retriggerable monostable multivibrator having a predetermined timing interval, said multivibrator being responsive to each of said first pulse signals for initiating substantially instantaneously generation of a corresponding one of said timing intervals.

4. The invention as defined in claim 3 wherein said logic network means includes a coincidence gate.

5. The invention as defined in claim 4 wherein said fourth pulse signal generating means includes bistable switching means selectively responsive to said second and third pulse signals for generating said fourth pulse signal.

6. A digital frequency comparator which comprises:

means for generating first pulse signals representative of the occurrence of each change of state of an applied signal;

means responsive to said first pulse signals for generating second pulse signals normally having a predetermined interval representative of a reference frequency, said predetermined interval being reinitiated in response to each one of said first pulse signals;

means responsive to said first and second pulse signals for generating third pulse signals representative of intervals when said first and second pulse signals are concurrently in a predetermined state, said concurrence occurring only when individual ones of said first pulse signals occur during the interval of said second pulse signals; and means selectively responsive to said second and third pulse signals for generating a fourth pulse signal representative of intervals when the frequency of said applied signal is greater than and less than said reference frequency.

7. The invention as defined in claim 6 wherein said second pulse signal generating means includes a retriggerable monostable multivibrator having a predetermined timing interval.

8. The invention as defined in claim 7 wherein said third pulse signal generating means includes coincidence gate means.

9. The invention as defined in claim 8 wherein said coincidence gate means includes a NAND gate having first and second inputs and an output, said first pulse signals being supplied to said first input and said second pulse signals being supplied to said second input and said third pulse signals being developed at said output.

10. The invention as defined in claim 9 wherein said fourth pulse signal generating means includes bistable switching means having a set input, a reset input and an output, said second pulse signals being supplied to said reset input, said third pulse signals being supplied to said set input and said bistable switching means being selectively responsive to said second and third pulse signals for generating said fourth pulse signal at said output, wherin predetermined states of said fourth pulse signal represent intervals when the frequency of said applied signal is greater than and less than said reference frequency.

* * * * *